(12) United States Patent
Noguchi et al.

(10) Patent No.: US 7,396,041 B2
(45) Date of Patent: Jul. 8, 2008

(54) CURTAIN AIRBAG DEVICE

(75) Inventors: Atsushi Noguchi, Moriyama (JP); Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 197 days.

(21) Appl. No.: 11/013,404

(22) Filed: Dec. 17, 2004

(65) Prior Publication Data

US 2005/0134028 A1     Jun. 23, 2005

(30) Foreign Application Priority Data

Dec. 19, 2003 (JP) .............................. 2003-423082

(51) Int. Cl.
   *B60R 21/16* (2006.01)
(52) U.S. Cl. ................. 280/730.2; 280/743.1; 280/749
(58) Field of Classification Search ............. 280/743.1, 280/730.2, 749, 729
   See application file for complete search history.

(56) References Cited

U.S. PATENT DOCUMENTS

| | | | | |
|---|---|---|---|---|
| 6,729,644 B2 * | 5/2004 | Hill | ......................... | 280/730.2 |
| 6,758,492 B2 * | 7/2004 | Tesch | ....................... | 280/730.2 |
| 6,962,364 B2 * | 11/2005 | Ju et al. | ..................... | 280/730.2 |
| 7,025,378 B2 * | 4/2006 | Wang | ....................... | 280/730.2 |
| 2003/0057683 A1 * | 3/2003 | Wipasuramonton et al. | ...... | 280/730.2 |

FOREIGN PATENT DOCUMENTS

| | | |
|---|---|---|
| JP | 2003-95055 | 4/2003 |
| JP | 2003-104162 | 4/2003 |

* cited by examiner

*Primary Examiner*—Eric Culbreth
(74) *Attorney, Agent, or Firm*—Foley & Lardner LLP

(57) ABSTRACT

A curtain airbag includes an inflatable cell below a non-inflatable portion that resists being bent when the curtain airbag is inflated. The curtain airbag has a non-inflatable portion and a plurality of inflatable cells that are disposed in front of, behind, above, and below the non-inflatable portion. The lower-side inflatable cell is formed in a convex shape that projects downwardly. When the curtain airbag is inflated, a tensile force acting to pull up the lower-side inflatable cell is generated in the non-inflatable portion. However, as the inflatable cell is formed in a convex shape that projects downwardly, the inflatable cell resists being pulled up and is, therefore, prevented from being bent.

18 Claims, 2 Drawing Sheets

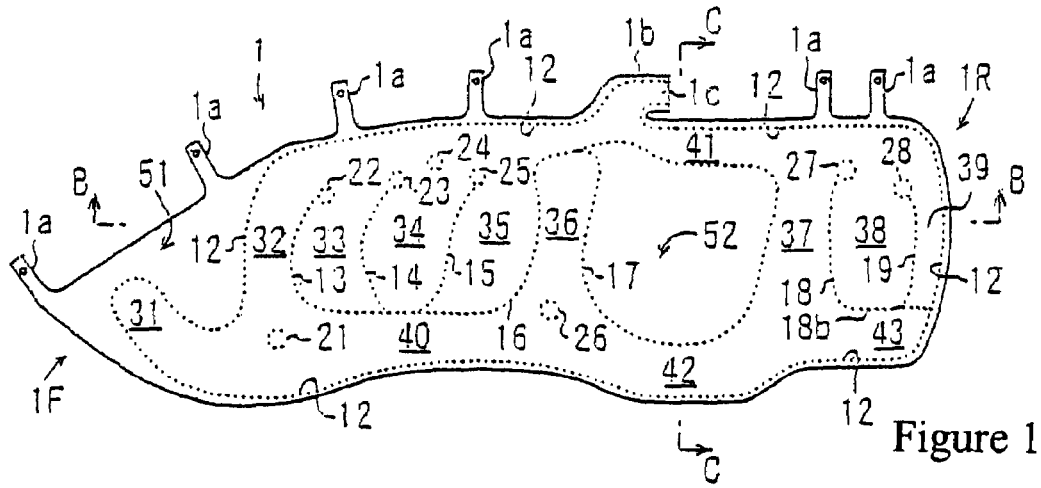
Figure 1A
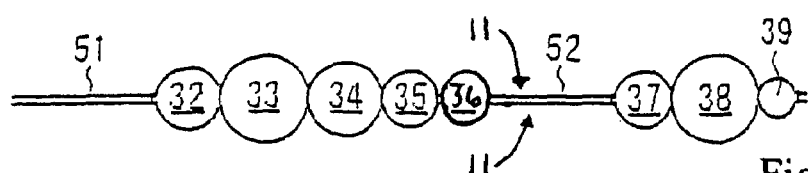
Figure 1B
Figure 1C
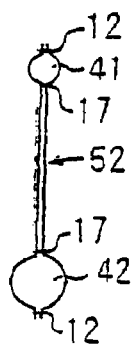
Figure 1D
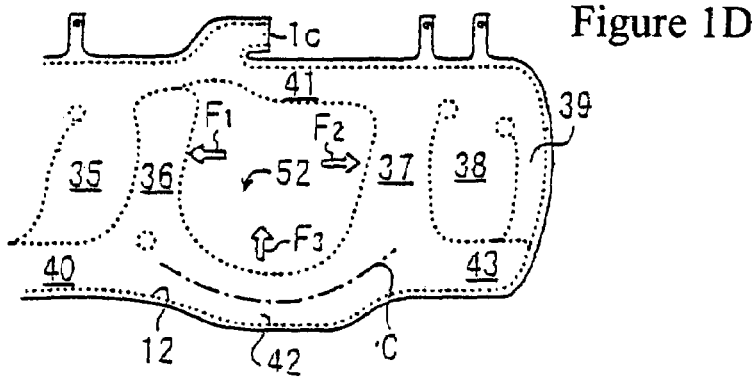
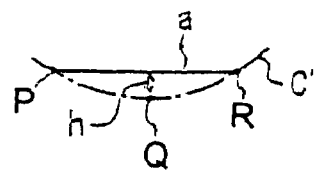
Figure 1E

CURTAIN AIRBAG DEVICE

BACKGROUND

The present invention relates to a curtain airbag device that includes a curtain-shaped airbag ("curtain airbag") to be deployed along an inner side surface of a vehicle cabin.

In an automobile provided with a curtain airbag device, a curtain airbag of the curtain airbag device is inflated downwardly along an inner side surface (for example, doors and pillars) of the vehicle cabin in the event that the automobile undergoes a lateral collision or rollover, thereby protecting the head of an occupant and restraining the occupant inside the cabin.

Japanese Patent Unexamined Publication No. 2003-104162 discloses an example of such a curtain airbag 60, as shown in FIGS. 2A-2B. In the curtain airbag 60, numeral 60a designates a seam for forming and defining inflatable cells, later described in detail. In addition, tabs 60b are provided for fixing the curtain airbag 60 to the vehicle body and a gas introduction port 60c is provided to receive gas from a gas generator (not shown).

In the curtain airbag 60, horizontally long inflatable cells 68, 69 are arranged above and below a non-inflatable portion 72 and vertically long inflatable cells 61-67 are arranged in front of and behind the non-inflatable portion. Specifically, the curtain airbag 60 includes, in order from the front to the rear, a non-inflatable portion 71, vertically inflatable cells 61, 62, 63, and 64, a non-inflatable portion 72, and vertically inflatable cells 65, 66, and 67. A horizontally inflatable cell 68, which is disposed above the non-inflatable portion 72, communicates with upper portions of the inflatable cells 64 and 65. In addition, a horizontally inflatable cell 69, which is disposed below the non-inflatable portion 72, communicates with lower portions of the inflatable cells 64 and 67.

During the inflation and deployment of the conventional curtain airbag 60, as shown in FIG. 2B, tensile forces $F_1$, $F_2$ in the vehicle longitudinal direction are exerted on the non-inflatable portion 72 by the inflatable cells 64, 65 in front of and behind the non-inflatable portion 72. As a result, the non-inflatable portion 72 is tensioned so as to restrain the occupant from moving toward the outside of the vehicle. However, because of the outward function of tensile forces $F_1$ and $F_2$, a tensile force $F_3$ is exerted upward on horizontally inflatable cell 69, below the non-inflatable portion 72. As a result of this vertical force $F_3$, the inflatable cell 69 may be constricted upward, i.e., bent into substantially inverted V shape, as shown in FIG. 2B. In turn, the surface area of the airbag 60 that is available to protect a vehicle occupant is reduced.

Accordingly, the present invention has been made in light of the aforementioned problems. More specifically, an object of the present invention is to provide a curtain airbag device capable of preventing (or at least greatly inhibiting) a bending of a horizontally inflatable cell that is below a non-inflatable portion.

SUMMARY

According to an embodiment of the present invention, a curtain airbag configured to be deployed downwardly along an inner side surface of a vehicle cabin is provided. The curtain airbag includes, among other possible things: (a) a non-inflatable portion; and (b) inflatable cells disposed along a front side and a rear side of the non-inflatable portion. A lower-side inflatable cell is disposed below the non-inflatable portion. The lower-side inflatable cell has a middle portion in a longitudinal direction of the lower-side inflatable cell that is formed in a convex shape projecting downwardly.

According to a further embodiment of this curtain airbag, a center line of the lower-side inflatable cell may have its lowermost point at a middle portion. Further, the center line may gradually rise from the middle portion toward the front side and the rear side.

According to another further embodiment of this curtain airbag, when the curtain airbag is not inflated, the lowermost point may be positioned from 10 to 150 mm lower than a segment of a line that connects points on the center line of the lower-inflatable cell that are 250 mm before and 250 mm behind the lowermost point.

According to an embodiment of the present invention, a curtain airbag device is provided. The curtain airbag device includes, among other possible things: (a) a curtain airbag configured to be deployed downwardly along an inner side surface of a vehicle cabin; and (b) a gas generator for supplying gas into the curtain airbag to inflate the curtain airbag. A portion of the curtain airbag is non-inflatable. Inflatable cells are disposed along a front side and a rear side of the non-inflatable portion. A lower-side inflatable cell is disposed below the non-inflatable portion. The lower-side inflatable cell has a middle portion in a longitudinal direction of the lower-side inflatable cell that is formed in a convex shape projecting downwardly.

According to a further embodiment of the curtain airbag device, a center line of the lower-side inflatable cell may have its lowermost point at a middle portion. Further, the center line may gradually rise from the middle portion toward the front side and the rear side.

According to another further embodiment of the curtain airbag device, when the curtain airbag is not inflated, the lowermost point may be positioned from 10 to 150 mm lower then a segment of a line that connects points on the center line of the lower-inflatable cell that are 250 mm before and 250 mm behind the lowermost point.

Another embodiment of the present invention addresses a vehicle that includes, among other possible things: (a) a curtain airbag configured to be deployed downwardly along an inner side surface of a vehicle cabin, the curtain airbag including, among other possible things: (i) a non-inflatable portion; and (ii) inflatable cells disposed along a front side and a rear side of the non-inflatable portion; and (b) a gas generator configured to supply gas to the curtain airbag in the event of collision or roller by the vehicle. A lower-side inflatable cell is disposed below the non-inflatable portion. The lower-side inflatable cell has a middle portion in a longitudinal direction of the lower-side inflatable cell that is formed in a convex shape projecting downwardly.

According to a further embodiment of this vehicle, a center line of the lower-side inflatable cell may have its lowermost point at a middle portion. Further, the center line may gradually rise from the middle portion toward the front side and the rear side.

According to another further embodiment of this vehicle, when the curtain airbag is not inflated, the lowermost point may be positioned from 10 to 150 mm lower than a segment of line that connects points on the center line of the lower-inflatable cell that are 250 mm before and 250 mm behind the lowermost point.

In the curtain airbag device according to the present invention, the inflatable cell below the non-inflatable portion is formed in a downwardly projecting shape when the curtain airbag is inflated and deployed. Therefore, even if tensile force $F_3$ as shown in FIG. 2B is exerted at the early stage of inflation and deployment of the airbag, the inflatable cell is prevented (or at least greatly inhibited) from being bent upwardly. Specifically, the center line of the lower-side inflatable cell has its lowermost point at a middle portion and has a line shape gradually rising from the middle portion toward the front side and the rear side. This line shape improves the effect of preventing the inflatable cell below the non-inflatable portion from being bent. In particular, when the curtain airbag is un-inflated, the lowermost point is positioned from 10 to 150 mm lower than a segment of a line connecting points on the center line of the lower-inflatable cell that are 250 mm before and 250 mm behind the lowermost point.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described as follows:

FIGS. 1A-1E show a curtain airbag device according to an embodiment of the present invention, in which FIG. 1A is a side view of the curtain airbag when inflated and deployed; FIG. 1B is a sectional view taken along a line B-B in FIG. 1A; FIG. 1C is a sectional view taken along a line C-C of FIG. 1A; FIG. 1D is an explanatory drawing showing tensile forces at a rear portion of the curtain airbag; and FIG. 1E is an explanatory drawing of the configuration of an inflatable cell below the non-inflatable portion.

DETAILED DESCRIPTION

Figure 2A:
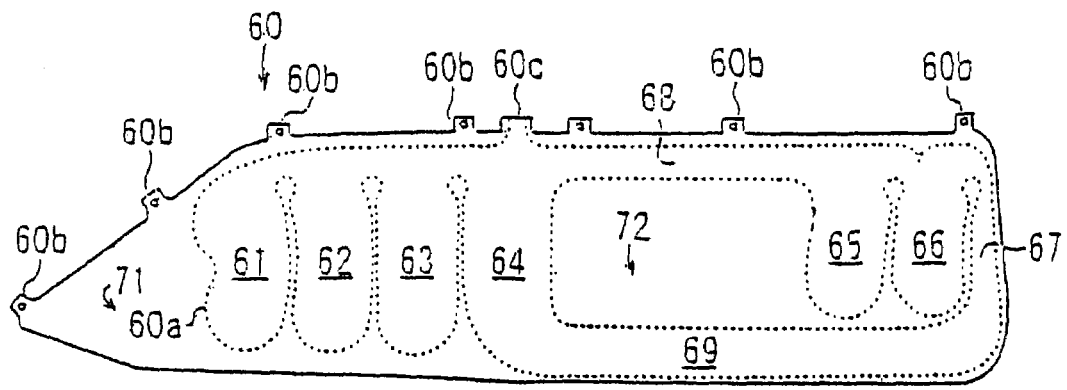
FIGS. 2A and 2B are side views of a conventional curtain airbag.

The present invention will now be described with reference to the FIGS. 1A-1E. In this embodiment, a curtain airbag 1 is disposed along a roof-side portion (boundary portion between the ceiling and the inner side surface of the vehicle cabin) of an automobile in a folded state in a longitudinally elongate shape. A roof-side garnish (not shown) is arranged at the roof-side portion such that the curtain airbag 1 is covered by the roof-side garnish.

The curtain airbag 1 is provided on the upper edge with tabs 1a that are fixed to the roof-side portion. The curtain airbag 1 is folded in zigzag fashion along folding lines extending in the longitudinal direction of the vehicle body and the tabs 1a are fixed to the roof-side rail.

A projection 1b is provided at the middle in the longitudinal direction of the upper edge. A gas introduction port 1c is formed in the projection 1b. The tip of the inflator is inserted into the gas introduction port 1c and is fixed by a band (not shown). The curtain airbag 1 starts to be inflated with gas from an inflator (i.e., gas generator) when the automobile undergoes a lateral collision or rollover. The airbag 1 is inflated and deployed downwardly along the inner side surface of the vehicle cabin such as doors and pillars.

The curtain airbag 1 is formed of two opposing sheets 11, 11 of the same configuration, one of which faces the side wall of the vehicle cabin and the other of which faces the interior of the vehicle cabin. The sheets 11, 11 are superposed on each other and are connected by line-shaped connected portions 12-19 (i.e., seams) and circular connected portions 21-28. The line-shaped connected portions 12-19 and the circular connected portions 21-28 form inflatable cells 31-43 and non-inflatable portions 51, 52, as hereafter discussed in detail.

The line-shaped connected portions 12-19 and the circular connected portions 21-28 are obtained by robust connecting means, e.g., sewing with high-strength yarns, bonding with high-adhesion adhesives, welding, or other suitable means. Moreover, the line-shaped connected portions 12-19 and the circular connected portions 21-28 are capable of gas-tightly connecting the sheets 11, 11 to prevent the sheets 11, 11 from being separated from each other, even when the internal pressure of the curtain airbag 1 rises to the upper design limit.

A line-shaped connected portion 12 extends substantially around the periphery of the curtain airbag 1. However, at the front end side 1F, the line-shaped connected portion 12 extends downwardly from the upper edge of the front end side 1F into a U-like shape, thereby for the non-inflatable portion 51 (along the upper edge of the front end side 1F) and the envelope-like inflatable cell 31. The line-shaped connected portion 12 also extends along the edges of the projection 1b of the curtain airbag 1 and discontinues across the rear edge of the projection 1b, thereby forming the gas introduction port 1c.

A vertically inflatable cell 32 is defined between the line-shaped connected portion 13 and a curved portion of the line-shaped connected portion 12 at the front side of the curtain airbag. The upper portion of the vertically inflatable cell 32 communicates with the gas introduction port 1c and the lower portion of the vertically inflatable cell 32 communicates with vertically inflatable cell 31 and horizontally inflatable cell 40.

A line-shaped connected portion 17, which is disposed slightly behind the center of the curtain airbag 1, extends around into a substantially square shape. The upper side and the lower side of the line-shaped connected portion 17 are spaced apart from the line-shaped connected portion 12 at the upper edge and the lower edge of the curtain airbag. As a result, the line-shaped connected portion 12 and the line-shaped connected portion 17 form an upper horizontally inflatable cell 41 and a lower horizontally inflatable cell 42 at the upper edge and the lower edge of the curtain airbag 1, respectively. The interior of the line-shaped connected portion 17 is isolated from the gas introduction port 1c. As a result, the interior of the line-shaped connected portion 17 defines the non-inflatable portion 52, which preferably extends 300-500 mm in the longitudinal direction of the vehicle.

Vertically inflatable cells 33, 34, 35, 36, which communicate with horizontally inflatable cells 40 and 41, are formed between the line-shaped connected portions 13, 14, 15, 16, 17, respectively. The vertically inflatable cells 33-35 open only at their upper side so as to communicate with the gas introduction port 1c. The vertically inflatable cell 36 opens only at its lower side so as to communicate with horizontally inflatable cells 40, 42.

At the rear side 1R of the curtain airbag 1, vertically inflatable cells 37, 38, 39 are formed by line-shaped connected portions 18, 18b, and 19, which are substantially U-shaped. The vertically inflatable cell 37 is disposed adjacent to the rear side of the non-inflatable cell 52 and communicates with the horizontally inflatable cells 41, 42 at its upper side and the lower side, respectively. The vertically inflatable cells 38, 39 open only at their upper side so as to communicate with the gas introduction port 1c.

A horizontally inflatable cell 43 is formed between a lower portion 18b of the line-shaped connected portion 18 and the line-shaped connected portion 12 along the lower edge of the curtain airbag. The horizontally inflatable cell 43 opens only at its front edge side so as to communicate with the horizontally inflatable cell 42.

The inflatable cell 42 at the lower side of the non-inflatable portion 52 is formed to have a center line C of a convex shape project downwardly, as shown in FIG. 1D. Specifically, the center line C has its lowermost position in a central portion of the horizontally inflatable cell 42. As a result, the center line C gradually rises upward from the central portion of the horizontally inflatable cell 42 toward both the front and rear ends of the horizontally inflatable cell 42.

As shown in FIG. 1E, a portion C' of the center line C is formed by plotting middle points in the vertical direction of the inflatable cell 42. A point Q is the lowermost point of the center line C'. A point P is a point on the center line C' 250 mm before the point Q and a point R is a point on the center line C' 250 mm behind the point Q. Further, the point Q is from about 10 to about 150 mm below a line a that connects points Q and R.

Figure 2B:
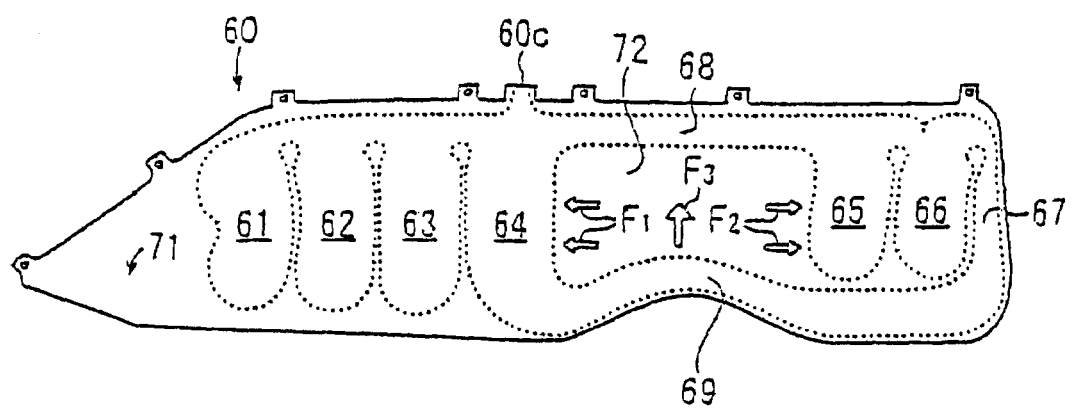

When an automobile with the curtain airbag device having the aforementioned structure undergoes a lateral collision or rollover, the inflator generates gas to start the inflation of the curtain airbag 1. The curtain airbag 1 pushes and opens the roof-side garnish and is deployed downwardly. As the curtain airbag 1 is inflated and deployed, as shown in FIG. 1D, tensile forces $F_1$, $F_2$ are generated to act on the non-inflatable portion 52 in the longitudinal direction. Correspondingly, tensile force F3 is generated in a vertical direction, thereby pulling up the lower-side inflatable cell 42. However, as the lower-side inflatable cell 42 is formed in a convex shape projecting downwardly, the inflatable cell 42 is prevented (or at least is greatly inhibited) from being constricted or bent upward into an inverted V-shape such as that suffered by the conventional airbag 60 shown in FIG. 2B. As a result, the non-inflatable portion 52 can be kept in a widely deployed state.

The aforementioned embodiment is an example of the present invention and the present invention may take other configurations. For example, the number and the arrangement of inflatable cells may be different from those of the illustrated embodiment. Moreover, the center line C' of the lower-side inflatable cell 42 may have a lowermost portion extending a predetermined length in the longitudinal direction of the vehicle.

The priority application, Japanese Application 2003-423082, which was filed Dec. 19, 2003, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. Moreover, the technical scope of the present invention is not limited to the embodiments described herein. Rather, modifications are permissible within the scope and spirit of the present invention. The scope of the present invention is to be defined as set forth in the following claims.

What is claimed is:

1. A curtain airbag configured to be deployed downwardly along an inner side surface of a vehicle cabin, the curtain airbag comprising:
   a non-inflatable portion; and
   inflatable cells disposed along a front side and a rear side of the non-inflatable portion,
   wherein a first lower-side inflatable cell and a second lower-side inflatable cell are disposed below the non-inflatable portion, and wherein the first and second lower-side inflatable cells each have a middle portion in a longitudinal direction of the lower-side inflatable cells that are formed in a convex shape projecting downwardly;
   wherein the first lower-side inflatable cell and the second lower-side inflatable cell are separated by a concave portion of the airbag that projects upwardly;
   wherein the convex shape of the first lower-side inflatable cell is directly below and directly abutting the non-inflatable portion;
   wherein a center line of the first lower-side inflatable cell has a lowermost point at a middle portion; and
   wherein the center line gradually rises from the middle portion toward the front side and the rear side.

2. A curtain airbag as claimed in claim 1, wherein, when the curtain airbag is not inflated, the lowermost point is positioned from 10 to 150 mm lower than a segment of a line that connects points on the center line of the first lower-inflatable cell that are 250 mm before and 250 mm behind the lowermost point.

3. A curtain airbag as claimed in claim 1, wherein the first lower-side inflatable cell, the second lower-side inflatable cell, and the concave portion are directly connected to one another.

4. A curtain airbag as claimed in claim 1, wherein the center line gradually rises upward from the middle portion to front and rear sides of the convex shape.

5. A curtain airbag device comprising:
   a curtain airbag configured to be deployed downwardly along an inner side surface of a vehicle cabin; and
   a gas generator for supplying gas into the curtain airbag to inflate the curtain airbag,
   wherein a portion of the curtain airbag is non-inflatable,
   wherein inflatable cells are disposed along a front side and a rear side of the non-inflatable portion,
   wherein a lower-side inflatable cell is disposed below the non-inflatable portion,
   wherein the lower-side inflatable cell has a portion in a longitudinal direction of the lower-side inflatable cell that is formed in a convex shape projecting downwardly;
   wherein the portion of the lower-side inflatable cell formed in a convex shape extends in a longitudinal direction of the curtain airbag for a distance that is less than a full length of the curtain airbag;
   wherein the convex shape of the lower-side inflatable cell is directly below and directly abutting the non-inflatable portion;
   wherein a center line of the lower-side inflatable cell has its lowermost point at a middle portion; and
   wherein the center line gradually rises from the middle portion toward the front side and the rear side.

6. A curtain airbag device as claimed in claim 5, wherein, when the curtain airbag is not inflated, the lowermost point is positioned from 10 to 150 mm lower than a segment of a line that connects points on the center line of the lower-inflatable cell that are 250 mm before and 250 mm behind the lowermost point.

7. A curtain airbag device as claimed in claim 5, wherein the lower-side inflatable cell is a first lower-side inflatable cell;
   further comprising a second lower-side inflatable cell with a portion in a longitudinal direction of the second lower-side inflatable cell that is formed in a convex shape projecting downwardly;

wherein the second lower-side inflatable cell is located forward of the first lower-side inflatable cell along a longitudinal direction of the curtain airbag.

8. A curtain airbag device as claimed in claim 7, further comprising a concave portion of the airbag that projects upwardly, wherein the concave portion separates the first lower-side inflatable cell and the second lower-side inflatable cell;

wherein the first lower-side inflatable cell, the second lower-side inflatable cell, and the concave portion are directly connected to one another.

9. A curtain airbag device as claimed in claim 5, wherein the center line gradually rises upward from the middle portion to front and rear sides of the convex shape.

10. A curtain airbag device comprising:
a curtain airbag configured to be deployed downwardly along an inner side surface of a vehicle cabin; and
a gas generator for supplying gas into the curtain airbag to inflate the curtain airbag,
wherein a portion of the curtain airbag is non-inflatable,
wherein inflatable cells are disposed along a front side and a rear side of the non-inflatable portion,
wherein a first lower-side inflatable cell and a second lower-side inflatable cell are disposed below the non-inflatable portion,
wherein the first and second lower-side inflatable cells each have a portion in a longitudinal direction of the lower-side inflatable cells that is formed in a convex shape projecting downwardly;
wherein the first lower-side inflatable cell and the second lower-side inflatable cell are separated by a concave portion of the airbag that projects upwardly;
wherein the convex shape of the first lower-side inflatable cell is directly below and directly abutting the non-inflatable portion;
wherein a center line of the first lower-side inflatable cell has a lowermost point at a middle portion; and
wherein the center line gradually rises from the middle portion toward the front side and the rear side.

11. A curtain airbag device as claimed in claim 10, wherein, when the curtain airbag is not inflated, the lowermost point is positioned from 10 to 150 mm lower than a segment of a line that connects points on the center line of the first lower-inflatable cell that are 250 mm before and 250 mm behind the lowermost point.

12. A curtain airbag device as claimed in claim 10, wherein the first lower-side inflatable cell, the second lower-side inflatable cell, and the concave portion are directly connected to one another.

13. A curtain airbag device as claimed in claim 10, wherein the center line gradually rises upward from the middle portion to front and rear sides of the convex shape.

14. A curtain airbag configured to be deployed downwardly along an inner side surface of a vehicle cabin, the curtain airbag comprising:
a non-inflatable portion; and
inflatable cells disposed along a front side and a rear side of the non-inflatable portion,
wherein a lower-side inflatable cell is disposed below the non-inflatable portion, and wherein the lower-side inflatable cell has a middle portion in a longitudinal direction of the lower-side inflatable cell that is formed in a convex shape projecting downwardly;
wherein the portion of the lower-side inflatable cell formed in a convex shape extends in a longitudinal direction of the curtain airbag for a distance that is less than a full length of the curtain airbag;
wherein the convex shape of the lower-side inflatable cell is directly below and directly abutting the non-inflatable portion;
wherein a center line of the lower-side inflatable cell has its lowermost point at a middle portion, and
wherein the center line gradually rises from the middle portion toward the front side and the rear side.

15. A curtain airbag as claimed in claim 14, wherein, when the curtain airbag is not inflated, the lowermost point is positioned from 10 to 150 mm lower than a segment of a line that connects points on the center line of the lower-inflatable cell that are 250 mm before and 250 mm behind the lowermost point.

16. A curtain airbag as claimed in claim 14, wherein the lower-side inflatable cell is a first lower-side inflatable cell;
further comprising a second lower-side inflatable cell with a middle portion in a longitudinal direction of the second lower-side inflatable cell that is formed in a convex shape projecting downwardly;
wherein the second lower-side inflatable cell is located forward of the first lower-side inflatable cell along a longitudinal direction of the curtain airbag.

17. A curtain airbag as claimed in claim 16, further comprising a concave portion of the airbag that projects upwardly, wherein the concave portion separates the first lower-side inflatable cell and the second lower-side inflatable cell;
wherein the first lower-side inflatable cell, the second lower-side inflatable cell, and the concave portion are directly connected to one another.

18. A curtain airbag as claimed in claim 14, wherein the center line gradually rises upward from the middle portion to front and rear sides of the convex shape.

* * * * *